United States Patent [19]

Rich

[11] 4,187,150
[45] Feb. 5, 1980

[54] DISTILLED WATER APPARATUS

[76] Inventor: Jay Rich, 8114 NW. 91st Ave., Tamarac, Fla. 33321

[21] Appl. No.: 898,786

[22] Filed: Apr. 21, 1978

Related U.S. Application Data

[63] Continuation of Ser. No. 675,543, Apr. 9, 1976.

[51] Int. Cl.$^2$ .......................... B01D 3/00; A47J 31/04
[52] U.S. Cl. ................... 202/182; 202/185 B;
202/190; 202/197; 203/10; 203/DIG. 16;
203/41; 99/290; 99/315
[58] Field of Search ................... 99/290, 313–315;
203/DIG. 17, DIG. 16, 10, 11, 86, 41, 40;
202/83, 185 B, 189, 190, 197

[56] References Cited

U.S. PATENT DOCUMENTS

| | | | |
|---|---|---|---|
| 23,603 | 4/1859 | Parish | 202/190 |
| 143,171 | 9/1873 | Lundgren | 202/190 |
| 505,641 | 9/1893 | Rochlitz | 203/DIG. 17 |
| 642,616 | 2/1900 | Lee | 203/DIG. 17 |
| 755,179 | 3/1904 | Smith | 203/DIG. 17 |
| 932,950 | 8/1909 | Behrens | 203/DIG. 17 |
| 1,086,684 | 2/1914 | Molesworth | 202/200 |
| 2,076,881 | 4/1937 | Cunningham | 99/290 |
| 2,432,887 | 12/1947 | Havilland | 203/DIG. 5 |
| 2,626,558 | 1/1953 | Stein | 99/290 |
| 2,800,434 | 7/1957 | Howlett et al. | 203/86 |
| 2,809,577 | 10/1957 | Sill | 99/290 |
| 2,907,699 | 10/1959 | Millidge et al. | 203/86 |
| 3,206,381 | 9/1965 | Neugebauer et al. | 203/86 |
| 3,957,589 | 5/1976 | Mayer | 202/185 B |

OTHER PUBLICATIONS

Scientific American, Jul. 2, 1898, vol. & page-unknown.

Primary Examiner—Wilbur L. Bascomb, Jr.
Attorney, Agent, or Firm—Joseph Zallen

[57] ABSTRACT

A distilled water apparatus which comprises in nested vapor-sealed arrangement, a bottom raw water tank, a storage tank and a cooling and condensing tank. The storage tank has an outer annular storage compartment surrounding a vertical vapor passage and can be equipped with a basket for holding coffee or the like so that the device acts as a self-contained distilled water coffee maker.

6 Claims, 4 Drawing Figures

DISTILLED WATER APPARATUS

This is a continuation of application, Ser. No. 675,543 filed Apr. 9th, 1976.

BACKGROUND OF INVENTION

This invention relates to devices which prepare distilled water and utilize such distilled water either as such or directly in the preparation of beverages such as coffee, tea or soup.

The increase in water pollution during the past few decades has resulted in tap water in many areas of the country which is not suitable for consumption because of taste, suspensions, bacterial content or mineral content. In many parts of the country bottled distilled water is purchased as such to alleviate these problems.

One object of the present invention is to provide an inexpensive device for providing small quantities of distilled water as desired in the home.

Another object of this invention is to provide a self-contained device wherein the distilled water is immediately used to make beverages such as coffee, tea or soup, which are stored in the device.

Other objects and advantages of this invention will be apparent from the description and claims which follow taken together with the appended drawings.

SUMMARY OF INVENTION

In its most general terms the invention comprises in vapor-sealed arrangement a bottom raw water tank which is adapted to be heated, a storage tank nested on the bottom tank, and a condensing tank nested on the storage tank. The storage tank has an inner wall which forms a passageway permitting water vapor to go from the bottom tank to the condensing tank and also forms an annular storage section surrounding the passageway and being open at the top and closed on the bottom. The condensing tank has a bottom wall preferably upwardly thrusting in the center, which seals off rising water vapor and forms an upper compartment for cooling water. The water vapor comes up from the bottom tank through the vapor passageway in storage tank, impinges on the bottom surface of the bottom wall of the cooling tank, condenses, and then drips down and collects in the annular storage section of the storage tank.

In one preferred form of the invention, the apparatus is of the size that can be accommodated on an ordinary household electric or gas range. In such a case the capacity of the raw water boiling tank would be in the order of two to six quarts. The storage tank section would have a smaller capacity and the condensing tank would be generally somewhat larger than the bottom tank. Where distilled water alone is used, the storage tank is discharging distilled water constantly into an external collecting vessel. Where a beverage such as coffee is being made the storage tank is larger and the beverage stored therein.

This invention will provide the user with pure distilled water that can be immediately used as such or, if desired, to brew coffee, tea or soup or similar hot beverages. The unit is arranged to operate on any convenient external heat source. However, if such a heat source is not available a heating unit can readily be incorporated into the bottom portion of the raw water tank.

The apparatus of this invention is characterized by the fact that it is a completely nesting arrangement with vapor seals that require no clamps or bolts or the like and can be readily assembled or disassembled. There are large openings for complete access to all parts so that cleaning is easy and simple. A wide variety of materials can be used to make the apparatus of this invention. However, it is preferred that porcelainized steel, stainless steel or teflon-coated aluminum be used.

Where the apparatus is to be used for the brewing of coffee a holder is provided which covers the top of the annular section and holds the ground coffee through which the condensing distilled water drips into the storage tank. A sight glass may be provided to show the amount of contents of the storage tank and the storage tank is preferably provided with a valve for draining. The condensing tank is also provided with a valve for draining cooling water and is also preferably equipped with a cover having turbine vanes which are actuated by the rising hot air resulting from the cooling water absorbing heat through its bottom wall.

The storage tank section or the raw water section can be provided with a baffle. The baffle for example can be suspended from a wire frame hung from the top edge of the center opening of the storage tank and comprise a single solid metal plate or perforated metal plate or fine mesh screen. The apparatus may also have a safety pressure relief-tube built into the top rim of the storage tank. This tube would have a weighted and hinged cover which would open when the pressure exceeded a predetermined amount.

Although dimensions are not critical an example of useful dimensions would be as follows:

The raw water boiling tank would have about a two and a half quart capacity, be seven inches in diameter and about four inches deep; the storage tank would be three inches deep and have a diameter of about eight inches; the cooling and condensing tank would be about nine inches in diameter and a height of about five inches. The peripheral rims and bottoms are shaped so as to provide nesting and vapor sealing.

For exceptional purity of distilled water, absorbent material can be spaced across the vapor passageway so as to contact all the water vapor rising therethrough. The absorbent material can be activated carbon, preferably of coarse grade. The absorbent material can be held in a cartridge or capsule having perforations or being made from a coarse screen. Activated carbon of $4 \times 10$ mesh in a stainless steel screen capsule of 16 mesh has been found to be suitable and does not significantly change the rate of distilled water formation.

SPECIFIC EXAMPLES OF INVENTION

Figure 1:
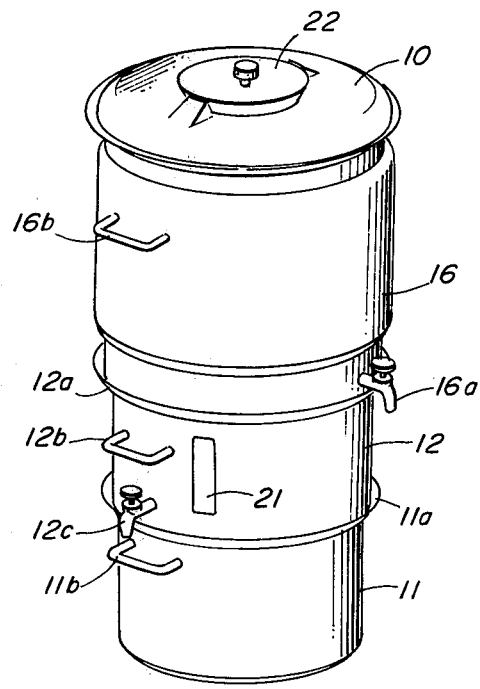
FIG. 1 is a perspective view of an embodiment of this invention employed to make a beverage such as coffee.
Figure 2A:
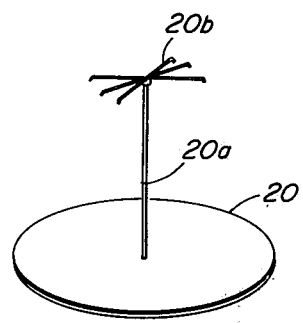
FIG. 2a is a perspective view of baffle 20.
Figure 2:
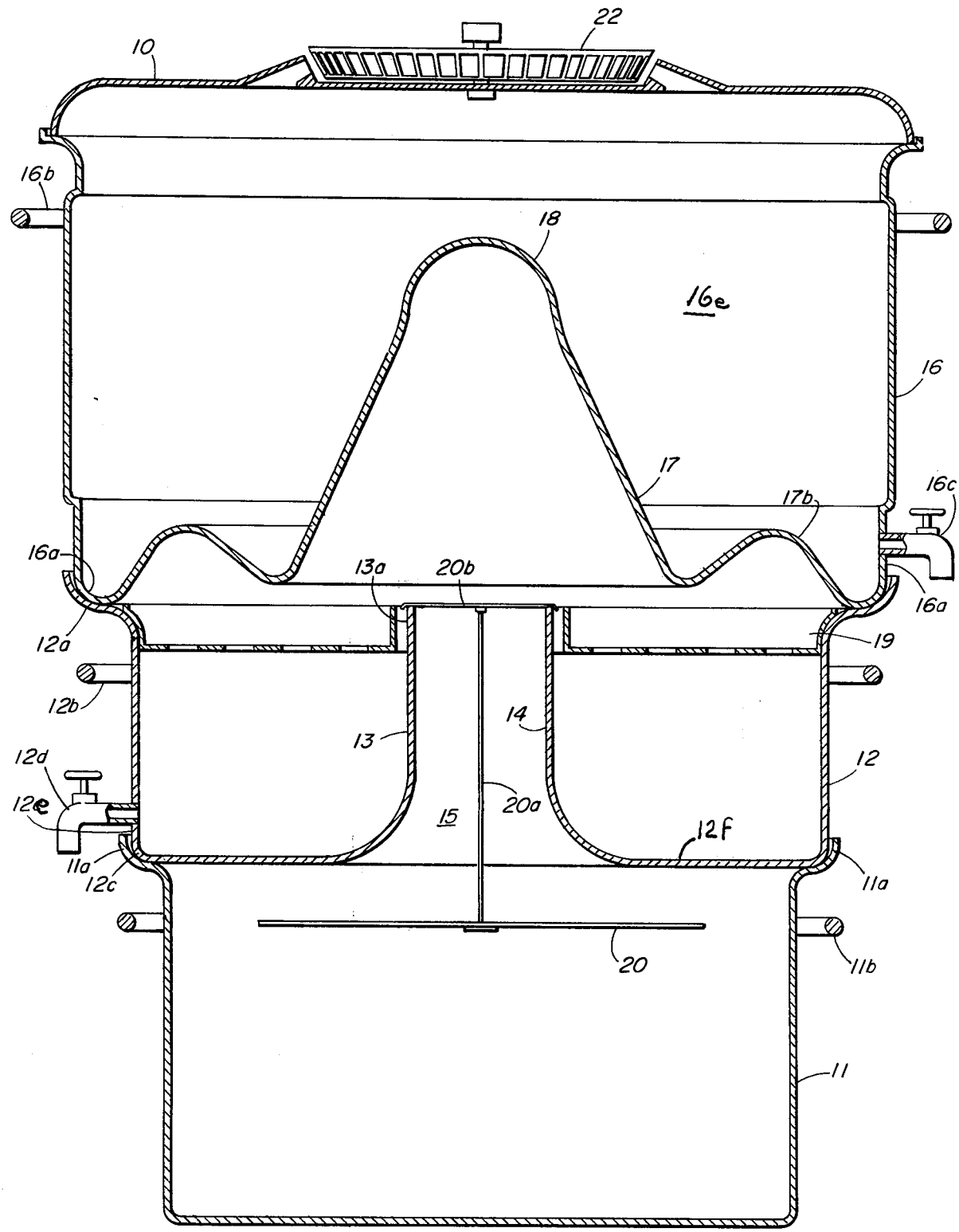
FIG. 2 is an elevation section across the center of FIG. 1.

Referring now to the drawings, FIGS. 1, 2 and 2a show an example of this invention as applied to the brewing of coffee with distilled water. The device comprises bottom tank 11, a storage tank 12 nested on the bottom tank and a condensing tank 16 nested on the storage tank. The bottom tank in which the raw water is placed, has an upper peripheral rim 11a and a handle 11b. The storage tank 12 has an outer side wall 12e forming a peripheral bottom contour 12c connecting to a bottom wall 12f extending upwardly to inner sidewall 14. The upper portion of side wall 12e extends to form an upper peripheral rim 12a in which the bottom contour 16a of the condensing tank nests.

The storage tank is open on its top surface except for a baffle 20 suspended by rod 20a from wires 20b. The inner wall 14 forms a tubular vapor passageway 15. The outer side wall 12e, inner side wall 14 and bottom wall 12f form an annular shaped storage compartment 13 open at the top 13a. A valve-equipped drain 12d is provided at the bottom of the storage compartment 13.

The condensing tank 16 has a cover 10 in which is positioned a rotary fan wheel 22. Tank 16 has a bottom wall 17 which has side convolutions 17b and has a central upward protrusion 18. The bottom wall is however continuous and forms an upper compartment 16e for cooling water. Tank 16 has a handle 16b.

The storage compartment 13 of the storage tank 12 can be used to accumulate the water vapor which rises from the raw water in tank 11 heated by being placed on a heat source such as electric or gas range and has a sight glass 21. The water vapor passes through the vapor passageway 15 up to the bottom wall 18 of the condensing tank. The cool water in the upper compartment of the condensing tank 16 cools the water vapor striking the bottom wall 17-17b-18 and condenses down into the storage compartment 13.

The condensing tank 16 has a valved drain 16c at the bottom of the upper cooling water compartment. This drain is used when the cooling water is too hot and must be changed.

When the device is used to make coffee or the like a perforated coffee basket 19 is seated in the annular shaped storage compartment 13.

All of the components of the apparatus of this invention, namely the bottom, storage and condensing tanks are generally cylindrical in shape except as otherwise noted and are nested together by upper peripheral rims and bottom contours so as to form a readily assembled or dissembled vapor sealed arrangement for the internal, self-contained production of distilled water and infusions made with distilled water, as for example, coffee.

It should be noted that whereas it is normally desirable to drain out the distilled water in the storage compartment when the apparatus is used solely for distilled water purposes, it is desirable to leave any beverage in the storage compartment as for example coffee, where the vapor from the bottom tank keeps the coffee or other beverage warm in the storage compartment.

The baffle 20 is provided for the express purpose of preventing the splashing of impurities that are often found in raw water and prevents them from being carried up by the moving water vapor.

Figure 3:
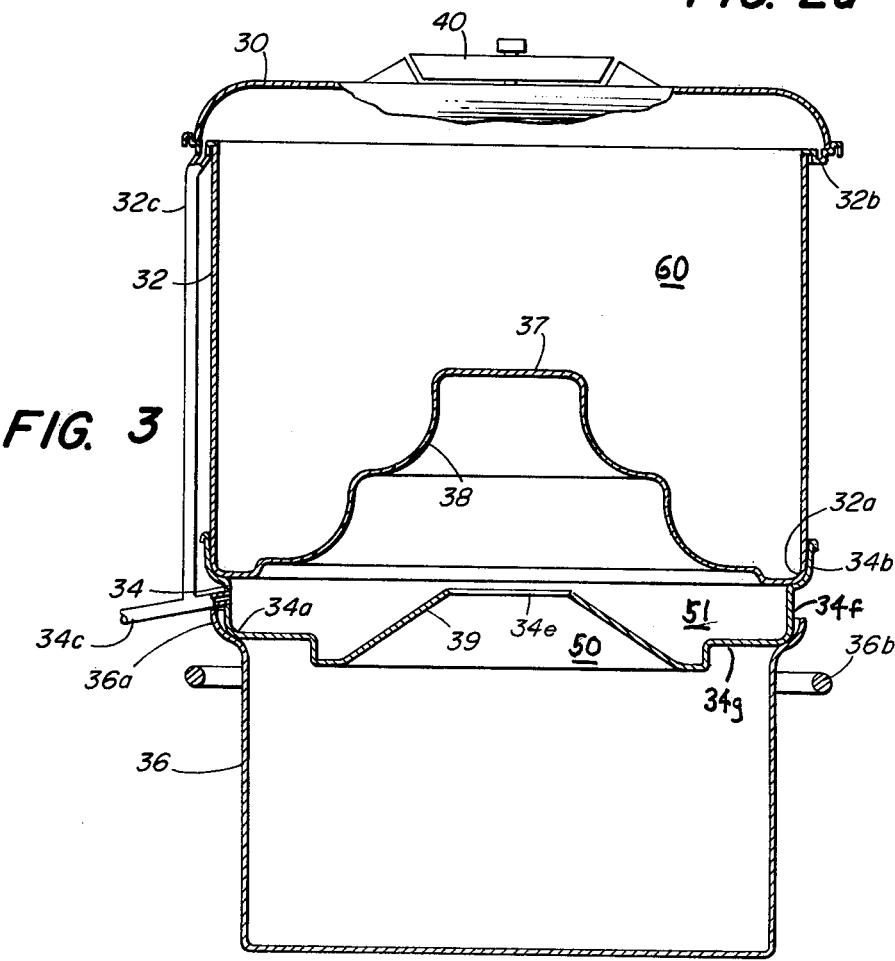
FIG. 3 is a central elevation view of an embodiment of this invention used to make and dispense distilled water.

In the example illustrated in FIG. 3 the construction is essentially similar to that illustrated in FIG. 2. However, this particular embodiment is designed especially for the production of distilled water which is to be removed from the apparatus rather than stored therein as in the case of the brewing of coffee. Although a baffle is not illustrated, one similar to that shown in FIG. 2 may be used.

Raw water tank 36 has an upper peripheral rim 36a and handle 36b, storage. tank 34 has a bottom peripheral contour 34a which nests with rim 36a. Storage tank 34 has an outer wall 34f, a bottom wall 34g and an upwardly thrusting central inner wall 39 which forms a vapor passageway 50. Walls 39, 34g and 34f form an annular storage compartment 51 which has a drain pipe 34c.

Condensing tank 32 has a bottom peripheral curvature 32a which nests in upper peripheral rim 34b of the storage tank 34. Tank 32 has an upwardly protruding bottom wall 37-38 which forms an upper compartment 60 for the cooling water. Tank 32 has a cover 30 provided with a fan wheel 40 and has a gutter 32b leading to a vapor escape conduit connecting the drain 34c.

In operation, the distillation apparatus of FIG. 3 is placed on a suitable heating unit after the raw water has been placed in tank 36. The heated water rises through the vapor passageway 50 up to the undulated bottom wall 37-38 of the condensing tank where the droplets that are formed collect down in the storage compartment 51 of the storage tank 34. The condensing action is provided by the cooling water placed in the upper compartment 60 of the condensing tank 32. As distilled water collects in the storage compartment 51 it is constantly drained off through drain 34c into an external container.

Where absorbent material is desired to be placed in the vapor passageway, a stainless steel screen cylinder of 16 mesh containing 4×10 mesh activated carbon can be fitted into vapor passageway 15 of FIG. 2 or through the opening 34e of vapor passageway 50 of FIG. 3.

I claim:

1. An apparatus for providing a distilled water infusion beverage, comprising in vapor-sealed arrangement and readily dissemblable a bottom tank in which raw water is placed and which is adapted to be heated, a storage tank nested on but unattached to said bottom tank, and a condensing tank nested on but unattached to said storage tank; said storage tank having an outer side wall, a bottom wall and an inner side wall; said bottom wall and inner wall forming a closed surface; a tubular vapor passageway being formed by said inner side wall and extending upwardly from said bottom wall; said outer and inner side walls forming a storage compartment with said bottom wall; the bottom wall of said condensing tank acting to seal off rising water vapor and forming an upper compartment for cooling water; said apparatus being so arranged that water vapor rising through said vapor passageway is condensed on said bottom wall of said condensing tank and drips down into said storage compartment; and a perforate infusion chamber positioned across the top portion of said storage tank extending from said outer wall to said inner wall of said storage tank for holding ground coffee or a similar infusion material, whereby said water that drips down from said bottom wall of said condensing tank passes through said infusion chamber on entering said storage tank.

2. An apparatus as set forth in claim 1, wherein said storage tank has a drain.

3. An apparatus as set forth in claim 1, wherein said condensing tank has a drain.

4. An apparatus as set forth in claim 1, wherein said condensing tank has a cover provided with a passageway from the outside to the interior of the condensing tank and a rotatable fan disc with spaced vanes within said passageway.

5. An apparatus as set forth in claim 1, and further including baffle means combined with said tubular vapor passageway.

6. An apparatus as set forth in claim 1 wherein absorbent material is spaced in said vapor passageway.

* * * * *